United States Patent
Yun et al.

(10) Patent No.: US 10,018,511 B2
(45) Date of Patent: Jul. 10, 2018

(54) INFRARED DETECTOR INCLUDING BROADBAND SURFACE PLASMON RESONATOR

(71) Applicant: Samsung Electronics Co., Ltd., Suwon-Si, Gyeonggi-Do (KR)

(72) Inventors: Seok-Ho Yun, Hwaseong-si (KR); Sung-hyun Nam, Yongin-si (KR); Sook-Young Roh, Suwon-si (KR); Hae-seok Park, Yongin-si (KR); Hyun-Gue Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 826 days.

(21) Appl. No.: 14/102,906

(22) Filed: Dec. 11, 2013

(65) Prior Publication Data

US 2016/0356652 A1    Dec. 8, 2016

(30) Foreign Application Priority Data

Dec. 11, 2012 (KR) .................. 10-2012-0143600

(51) Int. Cl.
*G01J 5/02*    (2006.01)
*G01J 5/20*    (2006.01)

(52) U.S. Cl.
CPC ...................... *G01J 5/20* (2013.01)

(58) Field of Classification Search
CPC ........ G01J 5/20; G01J 5/08; G01J 5/16; G01J 5/12; H04N 5/33
See application file for complete search history.

(56) References Cited

U.S. PATENT DOCUMENTS 6,633,656 B1 * 10/2003 Picard .................. G06K 9/0002
            340/5.53
7,491,938 B2 * 2/2009 Geneczko ................ G01J 3/36
            250/339.02

(Continued)

FOREIGN PATENT DOCUMENTS

| JP | 2008209216 A | 9/2008 |
| KR | 10-2012-0059019 | 6/2012 |
| WO | WO-2011131586 A2 | 10/2011 |

OTHER PUBLICATIONS

Korean Office Action dated Apr. 6, 2018 for KR Patent Application No. 10-2012-0143600 (English translation provided).

*Primary Examiner* — David Porta
*Assistant Examiner* — Mamadou Faye
(74) *Attorney, Agent, or Firm* — Harness, Dickey & Pierce, P.L.C.

(57) ABSTRACT

An infrared detector may be configured to detect a wide bandwidth of infrared spectrum using a broadband surface plasmon resonator. The infrared detector may include a substrate; a thermistor member disposed spaced from the substrate, the thermistor member having a resistance value that varies according to temperature; a resonator disposed on the thermistor member, the resonator configured to generate surface plasmon resonance; a pair of thermal legs configured to support the thermistor member such that the thermistor member is disposed spaced from the substrate; and a pair of conductive lead wires respectively disposed on the pair of thermal legs. The conductive lead wires may be configured to transmit signals to the substrate from the thermistor member and the resonator. The resonator may have a plurality of resonant frequencies and be configured to generate the surface plasmon resonance in a plurality of resonant modes.

10 Claims, 5 Drawing Sheets

(56) References Cited

U.S. PATENT DOCUMENTS

| | | | |
|---|---|---|---|
| 7,842,533 B2 * | 11/2010 | Liger | G01J 5/02 |
| | | | 257/232 |
| 2003/0020017 A1 | 1/2003 | Cole | |
| 2011/0180713 A1 * | 7/2011 | Noda | G01J 5/023 |
| | | | 250/338.4 |
| 2011/0204231 A1 | 8/2011 | Razansky et al. | |
| 2011/0304005 A1 * | 12/2011 | Brueckl | G01J 5/08 |
| | | | 257/467 |
| 2012/0075692 A1 * | 3/2012 | Baik | G02F 1/21 |
| | | | 359/344 |
| 2012/0132804 A1 | 5/2012 | Lee et al. | |
| 2012/0224255 A1 * | 9/2012 | Bora | B82Y 20/00 |
| | | | 359/346 |
| 2014/0226021 A1 * | 8/2014 | Koechlin | G01J 5/08 |
| | | | 348/165 |
| 2015/0192721 A1 * | 7/2015 | El-Kady | G02B 1/002 |
| | | | 359/352 |

\* cited by examiner

INFRARED DETECTOR INCLUDING BROADBAND SURFACE PLASMON RESONATOR

CROSS-REFERENCE TO RELATED APPLICATIONS

This application claims the benefit of Korean Patent Application No. 10-2012-0143600, filed on Dec. 11, 2012, in the Korean Intellectual Property Office, the disclosure of which is incorporated herein in its entirety by reference.

BACKGROUND

1. Field

Example embodiments relate to an infrared detector, and more particularly, to an infrared detector that is capable of detecting a wide bandwidth of the infrared spectrum.

2. Description of the Related Art

According to the principle of black body radiation, an object radiates a broadband electromagnetic wave that peaks in at a certain wavelength according to temperature. For example, an object radiates an infrared ray having a peak in a wavelength band of about 10 μm at room temperature. Bolometers are tools that absorb electromagnetic waves having an infrared (or terahertz) wavelength band radiated according to the principle of black body radiation, converts the absorbed electromagnetic waves into heat and then detects a temperature change due to the heat to measure radiation energy therearound.

Recently, in the development of micro electro mechanical system (MEMS) technologies, infrared detectors in which a plurality of microbolometers are arranged in a two-dimensional array are being designed. For example, thermal cameras, which are capable of acquiring thermo images, may use the infrared detectors. To realize a high-resolution thermal camera having high temperature accuracy, a pixel of a small size may be required. However, in a case where Salisbury screen type bolometers are used, in which a ground plate and a heat absorber are disposed at an interval of about λ/4 (where, λ is a centroid wavelength of an infrared wavelength band to be detected), when a screen having pixels decreases in size, an energy amount incident into the pixel may be reduced causing a decrease in temperature variations and a signal-to-noise ratio.

Lately, the use of bolometers using localized surface plasmon resonance (LSPR) is being proposed instead of using Salisbury screen type bolometers. Surface plasmon refers to a type of electromagnetic wave generated due to charge density oscillation of electrons that occur on a surface of a metal. Bolometers using a plasmonic absorber may overcome limitations of low absorption and low signal-to-noise ratio due to the LSPR.

However, since the plasmonic absorber may have relatively narrow bandwidth, it may be difficult to effectively absorb heat of the entire infrared region of about 8 μm to about 14 μm which is typically used for acquiring thermo images. Thus, it may be beneficial to increase the resonance bandwidth of plasmonic absorbers.

SUMMARY

One or more example embodiments are directed to an infrared detector which is capable of detecting an infrared spectrum having a wide bandwidth.

Additional aspects will be set forth in part in the description which follows and, in part, will be apparent from the description, or may be learned by practice of the presented example embodiments.

According to an example embodiment, an infrared detector includes: a substrate; a thermistor member disposed spaced from the substrate, the thermistor member having a resistance value that varyies according to temperature; a resonator disposed on the thermistor member, the resonator configured to generate surface plasmon resonance; a pair of thermal legs configured to support the thermistor member such that the thermistor member is disposed spaced from the substrate; and a pair of conductive lead wires respectively disposed on the pair of thermal legs, the pair of conductive lead wires configured to transmit signals to the substrate from the thermistor member and the resonator, wherein the resonator has a plurality of resonant frequencies and generates the surface plasmon resonance in a plurality of resonant modes.

In one embodiment, the infrared detector may further include a reflective plate disposed on a surface of the substrate such that the reflective plate faces the thermistor member and the resonator, the reflective plate configured to reflect an incident electromagnetic wave.

In one embodiment, the infrared detector may further include a pair of support members that vertically protrude from the substrate, wherein a first end of each of the pair of thermal legs may be connected to an upper portion of each of the pair of support members in a cantilever shape, and a second end of each of the pair of thermal legs may be connected to the thermistor member.

In one embodiment, the pair of thermal legs may be respectively connected to a first side and a second side of the thermistor member.

In one embodiment, a plurality of thermistor members may be provided and arranged in series or in parallel to one other, wherein a first thermal leg of the pair of thermal legs may be connected to one of the plurality of thermistor members, and a second thermal leg of the pair of thermal legs may be connected to another one of the plurality of thermistor members.

In one embodiment, the infrared detector may further include a connection member configured to connect two adjacent thermistor members to each other.

In one embodiment, the infrared detector may include a plurality of resonators of a same size and a same shape may be provided on the plurality of thermistor members.

In one embodiment, a distance between the two adjacent thermistor members of the plurality of thermistor members may be less than the infrared wavelength.

In one embodiment, ahe distance may be less than 8 μm.

In one embodiment, the thermistor member may be formed of at least one of amorphous silicon, vanadium oxide, nickel oxide, and Si—Ge.

In one embodiment, the resonator may include a metal thin film formed of Gold (Au), Silver (Ag), Platinum (Pt), Copper (Cu), Aluminum (Al), Titanium (Ti), or an alloy thereof.

In one embodiment, the resonator may have four sides, each of the four sides may have at least two arms protruding in a direction perpendicular to and from each of the four sides.

In one embodiment, each of two first resonant parts is disposed between two arms facing each other in a first direction, each of two second resonant parts is disposed between two arms facing each other in a second direction perpendicular to the first direction, and four folded third resonant parts are disposed between two arms.

In one embodiment, the at least two arms may have the same protrusion length.

In one embodiment, the at least two arms respectively disposed on opposite sides facing each other may have different protrusion lengths, and the arms disposed on the same side may have the same protrusion length.

In one embodiment, the arms respectively disposed on opposite sides facing each other may have the same protrusion length, and the arms disposed on the same side may have different protrusion lengths.

In one embodiment, the at least two arms may face each other, and a distance between ends of the at least two arms facing each other may be between 2.5 μm and 3 μm.

In one embodiment, the resonator may be in a shape of a circular disk and include a plurality of arms protruding in a circular shape from an outer circumference surface of the circular disk.

In one embodiment, the resonator may include two rod components perpendicular to each other in a cross shape, and an end of each of the rod components may be rectangularly bent.

In one embodiment, the resonator may include two rod components perpendicular to each other in a cross shape and protrusions protruding from both side surfaces of each of the rod components.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, an infrared detector including a broadband surface plasmon resonator will be described in detail with reference to the accompanying drawings. Like reference numerals in the drawings denote like elements. In the drawings, the sizes or thicknesses of elements may be exaggeratedly illustrated for clarity and convenience of description.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Structure of the Infrared Detector

Figure 1:
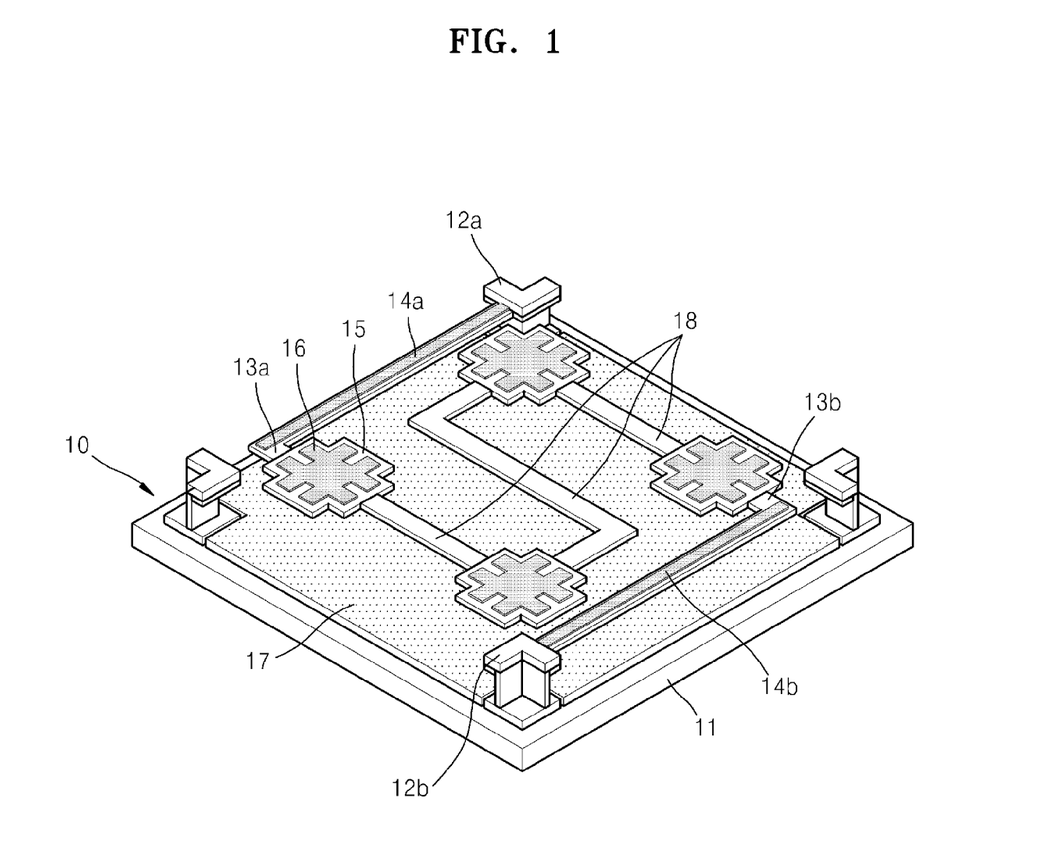
FIG. 1 is a schematic perspective view illustrating a unit pixel of an infrared detector according to an example embodiment.

FIG. 1 is a schematic perspective view illustrating one unit pixel of an infrared detector according to an embodiment.

Referring to FIG. 1, in an infrared detector 10, a unit pixel may include a substrate 11, a pair of support members 12a and 12b protruding from the substrate 11, a thermistor member 15 supported by the support members 12a and 12b so that the thermistor member 15 is spaced from and suspended above the substrate 11, a resonator 16 disposed on the thermistor member 15, a pair of thermal legs 13a and 13b connecting the support members 12a and 12b to the thermistor member 15, a pair of lead wires 14a and 14b disposed on surfaces of the thermal legs 13a and 13b, and a reflective plate 17 disposed facing the thermistor member 15 and the resonator 16 on a surface of the substrate 11 to reflect incident electromagnetic waves.

Although not shown, a driving circuit for controlling an operation of the infrared detector 10 and reading the intensity of detected infrared rays, an image signal processing circuit for processing an image signal, and various conductive wires may be further disposed on the substrate 11. Also, an insulative dielectric layer may be further disposed between the thermistor member 15 and the resonator 16 to electrically insulate the resonator 16 from the thermistor member 15.

The support members 12a and 12b may vertically protrude from the substrate 11 within the unit pixel of the infrared detector 10, for example, in diagonal directions. Each of the thermal legs 13a and 13b may have one end connected to an upper portion of each of the support members 12a and 12b, for example, in a cantilever shape. That is, the first thermal leg 13a may be connected to the first support member 12a so that the first thermal leg 13a is spaced from the substrate 11, and the second thermal leg 13b may be connected to the second support member 12b so that the second thermal leg 13b is spaced from the substrate 11. For example, the pair of thermal legs 13a and 13b may be horizontally disposed along an edge of the unit pixel in parallel to each other.

Also, the lead wires 14a and 14b may be disposed on surfaces of the thermal legs 13a and 13b, respectively. For example, although the lead wires 14a and 14b are disposed on top surfaces of the thermal legs 13a and 13b in FIG. 1, the present invention is not limited thereto. For example, the lead wires 14a and 14b may be disposed on the other surfaces of the thermal legs 13a and 13b, respectively.

Although not shown in detail, the lead wires 14a and 14b may be connected to the driving circuit (not shown) on the substrate 11 via the support members 12a and 12b, respectively. As will be described in more detail later, the lead wires 14a and 14b may transmit signals generated in the thermistor member 15 and the resonator 16 to the substrate 11, particularly, the driving circuit disposed on the substrate 11.

While one end of the thermal legs 13a and 13b may be connected to the support members 12a and 12b, the thermistor member 15 may be connected to the other end of each of the thermal legs 13a and 13b. Thus, the thermistor member 15 may be supported to be spaced from the substrate 11 by the thermal legs 13a and 13b and the support members 12a and 12b.

Although four thermistor members 15 are illustrated as an example in FIG. 1, example embodiments are not limited thereto. For example, at least two, three, five or more thermistor members 15 may be provided. Alternatively, only one thermistor member 15 may be disposed within the unit pixel of the infrared detector 10. In the case where only one thermistor member 15 is disposed within the unit pixel, the thermal legs 13a and 13b may be connected to both sides of the one thermistor member 15, respectively. As shown in FIG. 1, in the case where the plurality of thermistor members 15 are disposed within the unit pixel of the infrared detector 10, the plurality of thermistor members 15 may be arranged in series or parallel to one other. For example, the first thermal leg 13a may be connected on one thermistor member 15, and the second thermal leg 13b may be connected to another thermistor member 15. The remaining thermistor members 15 may be connected in series or in parallel between the two thermistor members 15 respectively connected to the first and second thermal legs 13a and 13b, through connection members 18. That is, the connection members 18 may connect two thermistor members 15 adjacent to each other.

The thermistor member 15 may be formed of a thermistor material that changes in resistance according to a temperature change. For example, the thermistor member 15 may be formed of a metal material, metal oxide, or a semiconductor material which changes in resistance by heat, for example, amorphous silicon, vanadium oxide, nickel oxide, GeSbTe (Germanium-Antimony-Tellurium), or Si—Ge. In addition, the thermal legs 13a and 13b and the connection members 18 may be formed of the same material as the thermistor material 15. In the case where the thermal legs 13a and 13b and the connection members 18 are formed of the same material as that of the thermistor member 15, when the infrared detector 10 is manufactured by using a MEMS method, the manufacturing process may be simplified. However, the thermal legs 13a and 13b and the connection members 18 may be formed of an insulative dielectric material different from that of the thermistor member 15, such as silicon nitride or silicon oxide.

The resonator 16, which generates surface plasmon resonance (SPR), may be disposed on a surface of the thermistor member 15. As shown in FIG. 1, in the case where the plurality of thermistor members 15 are disposed within the unit pixel of the infrared detector 10, the resonator 16 may be disposed on a surface of each of the thermistor members 15. The resonator 16 may be a metal thin film formed of a material which is capable of generating the plasmon resonance, for example, Au, Ag, Pt, Cu, Al, Ti, or an alloy thereof. The resonator 16 may be patterned in a desired (or, alternatively, a predetermined) shape so that the SPR is generated in an infrared wavelength band (e.g., about 8 μm to 14 μm) to be detected. The plurality of resonators 16 disposed within the unit pixel of the infrared detector 10 may have the same size and shape.

Figure 2:
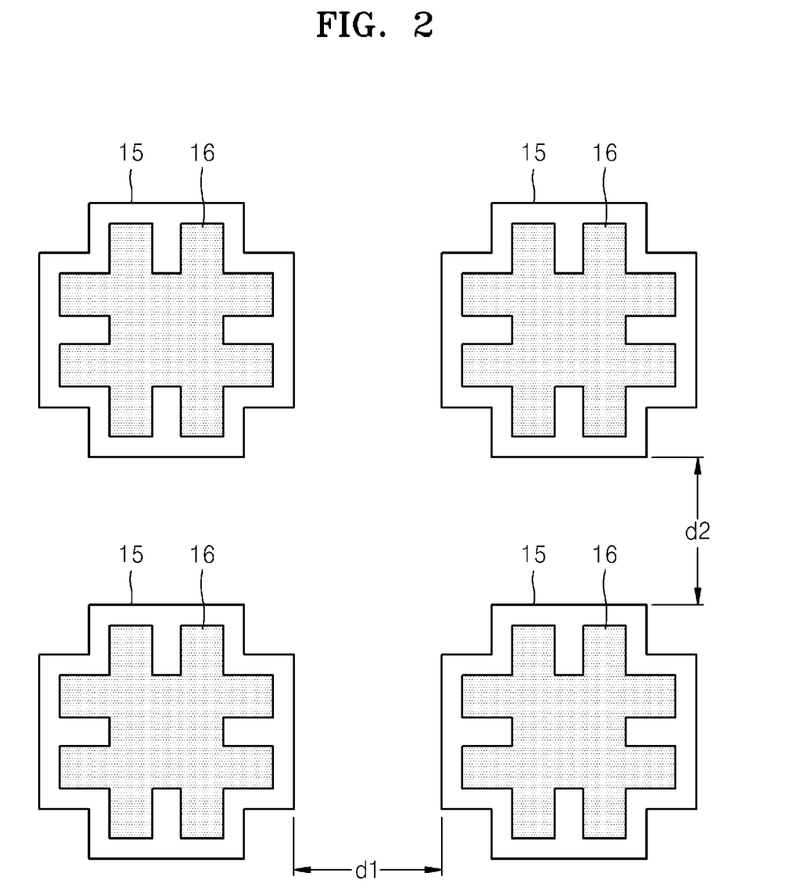
FIG. 2 is a perspective view illustrating an arrangement structure of a plurality of resonators disposed within a unit pixel according to an example embodiment.

FIG. 2 is a perspective view illustrating an arrangement structure of a plurality of resonators disposed within a unit pixel according to an example embodiment.

Referring to FIG. 2, the plurality of thermistor members 15 and resonators 16 may be arranged in an array having a 2×2 matrix. However, the plurality of thermistor members 15 and resonators 16 may be arranged in different manners. For example, there may be an arrangement in which only one thermistor member 15 and only one resonator 16 are disposed within the unit pixel of the infrared detector 10. Alternatively, at least five thermistors 15 and resonators 16 may be provided within the unit pixel. In the case where the plurality of thermistor members 15 and resonators 16 are arranged within the unit pixel of the infrared detector 10, a distance between the thermistor members 15 adjacent to each other may be adequately adjusted to reduce a diffraction loss. That is, since a gap between each of the adjacent thermistor members 15 serves as a diffraction slit, when an infrared ray having a wavelength band to be detected is diffracted in the gap, the infrared detector 10 may be reduced in efficiency. Thus, the distance between the thermistor members 15 adjacent to each other may be set to less than a wavelength of the infrared wavelength band to be detected to prevent the infrared ray incident into the infrared detector 10 from being diffracted. For example, each of a horizontal distance d1 and vertical distance d2 between the thermistor members 15 may be less than about 8 μm, particularly, about 6 μm.

Also, the reflective plate 17 may be disposed on the surface of the substrate 11 to face the thermistor member 15 and the resonator 16. The reflective plate 17 may reflect the infrared ray incident into the unit pixel of the infrared detector 10 to increase infrared absorption into the thermistor member 15 and the resonator 16. The reflective plate 17 may be disposed over an entire top surface of the substrate 11. Like the resonator 16, the reflective plate 17 may be a metal thin film formed of, for example, Au, Ag, Pt, Cu, Al, Ti, or an alloy thereof.

Operation of the Infrared Detector

An operation of the infrared detector 10 having the above-described structure will be described below.

If an electromagnetic wave having an infrared wavelength band (e.g., about 8 μm to about 14 μm) to be detected in the infrared detector 10 is incident, the surface plasmon resonance (SPR) may be generated in the resonator 16 by energy of the electromagnetic wave. Electromagnetic waves are absorbed into the resonator 16, and the remaining electromagnetic waves that are not initially absorbed into the resonator 16 may be reflected by the reflective plate 17 and then incident into the resonator 16 to increase absorption efficiency. When the SPR is generated in the resonator 16, heat may be generated. Thus, the thermistor member 15 in contact with the resonator 16 may increase in temperature. The thermistor member 15 may vary in resistance due to the temperature change. The resistance of the thermistor member 15 may be measured through the lead wires 14a and 14b respectively disposed on the surfaces of the thermal legs 13a and 13b. For example, when a voltage is applied between the two lead wires 14a and 14b, current flowing between the two lead wires 14a and 14b may vary according to the resistance of the thermistor member 15. Thus, the driving circuit (not shown) disposed on the substrate 11 may measure the current flowing between the two lead wires 14a and 14b to measure the intensity of the infrared ray incident into the infrared detector 10.

Figure 3:
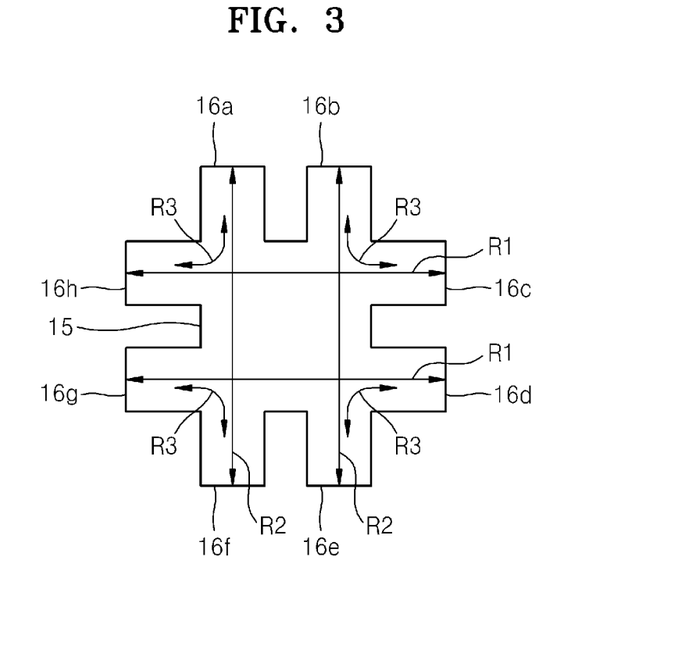
FIG. 3 is a schematic view illustrating a principle in which the resonators of FIG. 1 have a plurality of resonant frequencies.

FIG. 3 is a schematic view illustrating a principle in which the resonators of FIG. 1 have a plurality of resonant frequencies.

The resonator 16 may be designed to have a plurality of resonant frequencies within the infrared wavelength band (e.g., about 8 μm to about 14 μm) to be detected to generate the SPR in a plurality of resonant modes. To have different resonant frequencies, the resonator 16 may be patterned in various shapes.

As shown in FIG. 3, the resonator 16 may have a rectangular shape having four sides with two arms 16a to 16h protruding from each of the sides in a direction perpendicular to each of the sides. Thus, the resonator 16 of FIG. 3 may have a shape in which two rods parallel to each other in a first direction and two rods parallel to each other in a second direction perpendicular to the first direction overlap each other. Thus, two first resonant parts R1 may be respectively disposed between the two arms 16c and 16h that face each other in the first direction and between the two arms 16d and 16g that face each other in the first direction, and two second resonant parts R2 may be respectively disposed between the two arms 16a and 16f that face each other in the second direction and between the two arms 16b or 16e that face each other in the second direction perpendicular to the first direction. Also, in this structure, four folded third resonant parts R3 may respectively be disposed between the adjacent arms 16a and 16h, the adjacent arms 16b and 16c, the adjacent arms 16d and 16e, and the adjacent arms 16f and 16g. Each of the third resonant parts R3 may have a resonant frequency less than that of each of the first and second resonant parts R1 and R2.

If each of the arms 16a to 16h has the same protrusion length, the first and second resonant parts R1 and R2 may have the same resonant frequency but different resonant directions. For example, if each of the first and second resonant parts R1 and R2 has a resonant wavelength of about 10 μm, respective distances (i.e., a width of the resonator 16) between ends of the two arms 16a and 16f that face each other, ends of the two arms 16b and 16e that face each other, ends of the two arms 16c and 16h that face each other, and ends of the two arms 16d and 16g that face each other may be about 2.5 μm to about 3 μm. Alternatively, the arms 16c, 16d, 16g, or 16h protruding in the first direction may have a length different from that of the arms 16a, 16b, 16e, and 16f protruding in the second direction. In this case, the two resonant parts R1 and R2 may have resonant frequencies different from each other.

Figure 4:
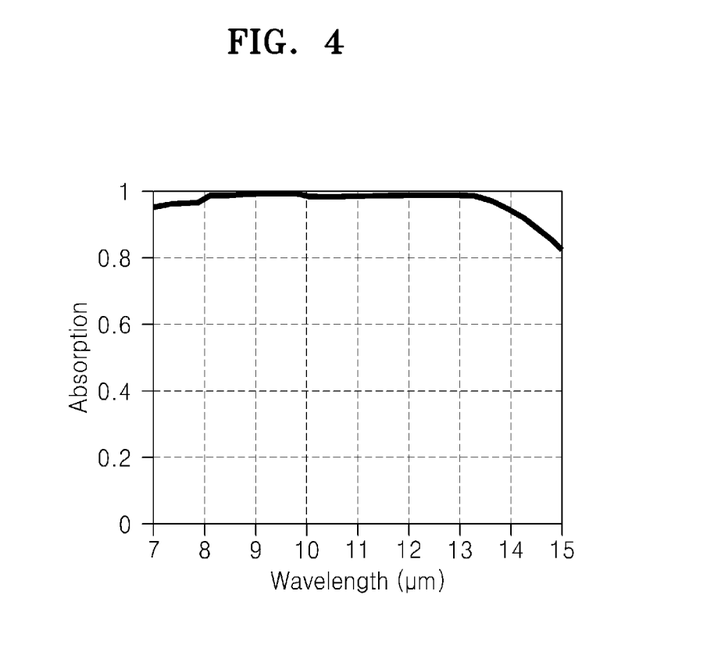
FIG. 4 is a graph illustrating an example of an infrared absorption spectrum of an infrared detector of FIG. 3.

FIG. 4 is a graph illustrating results obtained by simulating an infrared absorption spectrum of an infrared detector of FIG. 3.

As illustrated in FIG. 4, since the resonator 16 is configured to have various resonant frequencies, the infrared detector 10 may obtain constantly high detection characteristics in a broadband infrared wavelength.

In FIG. 3, the resonator 16 includes two arms that are disposed on each of four sides of a square, i.e., a total eight arms. It is assumed that the arms facing each other are symmetrically disposed with respect to a central axis of the resonator 16. Referring to the graph of FIG. 4, it is seen that the resonator 16 has a very uniform absorption rate approaching about 1 within the wavelength band of about 8 μm to about 14 μm. Thus, when the resonator 16 having the above-described structure is used, the infrared detector 10 may detect almost all infrared rays at a uniform high efficiency within the wavelength band of about 8 μm to about 14 μm.

As described above, in one or more example embodiments, since the infrared detector includes the resonator 16 that generates the SPR in the plurality of resonant modes, an electromagnetic wave having a broadband infrared wavelength may be detected by using only one kind of resonator 16 of a single shape and size. Thus, it may be unnecessary to provide various kinds of resonators within the unit pixel, therefore, a space for disposing the thermal legs 13a and 13b and the lead wires 14a and 14b may be easily secured.

Further, as described above, in one or more example embodiments, since the diffraction loss may be reduced so as to further increase the absorption rate, the signal-to-noise ratio may also be improved. As a result, the unit pixel of the infrared detector 10 may decrease in size to improve resolution.

FIGS. 5A to 5F are schematic plan views illustrating exemplified shapes of various available resonators.

As illustrated in FIGS. 5A to 5F, the resonator 16 may have various shapes in addition to the shape of the the resonator 16 illustrated in FIG. 3.

Figure 5A:
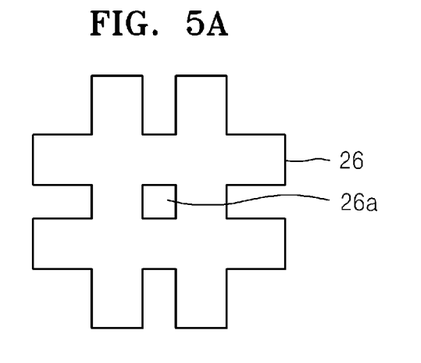
FIGS. 5A to 5F are schematic plan views illustrating exemplified shapes of various available resonators.

A resonator 26 shown in FIG. 5A may be generally the same as the resonator 16 of FIG. 3 except that an opening 26a is further defined in a central portion of the resonator 26. That is, as shown in FIG. 5A, the resonator 26 having an opening 26a in the central portion thereof may be used. Although the opening 26a has a square shape as illustrated in FIG. 5A, example embodiments are not limited thereto. For example, the opening 26a may have a circular or polygonal shape.

Figure 5B:
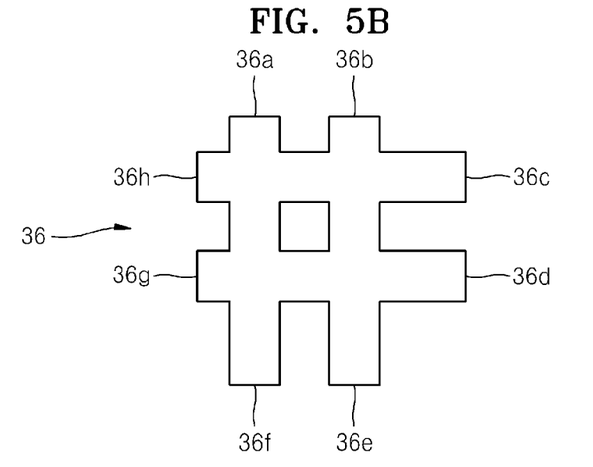

A resonator 36 shown in FIG. 5B may include a plurality of arms 36a to 36h protruding asymmetrically therefrom. For example, the right arms 36c and 36d may further protrude than the left arms 36g and 36h. Also, the lower arms 36e and 36f may protrude further than the upper arms 36a and 36b. That is, the arms 36a and 36f, 36b and 36e, 36c and 36h, and 36d and 36g that are respectively disposed on opposite sides facing each other may have different lengths. However, as shown in FIG. 5B, the arms 36a and 36b, 36c and 36d, 36e and 36f, and 36g and 36h that are respectively disposed on the same side may have the same protrusion length.

Figure 5C:
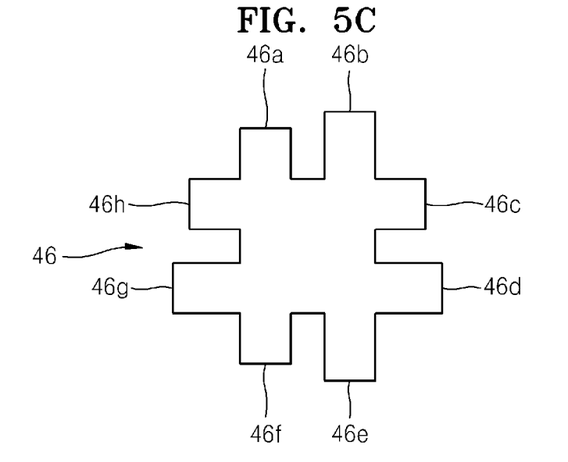

A resonator 46 shown in FIG. 5C may include arms 46a and 46b, 46c and 46d, 46e and 46f, and 46g and 46h that are respectively disposed on the same side and have different lengths. In FIG. 5C, the resonator 46 is symmetrical in a horizontal or vertical direction. That is, the arms 46a and 46f, 46b and 46e, 46c and 46h, and 46d and 46g that are respectively disposed on opposite sides facing each other may have the same protrusion length. However, like FIG. 5B, the asymmetrical resonator 46 may be provided. For example, all of the eight arms 46a and 46b, 46c and 46d, 46e and 46f, and 46g and 46h may have different lengths.

Although the arms are disposed on the four sides of the rectangular shape in FIGS. 3 and 5A to 5C, example embodiments not limited thereto. For example, resonators having different shapes may be used.

Figure 5D:
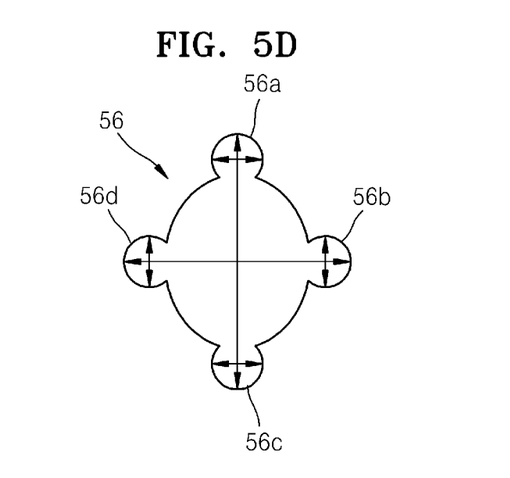

A resonator 56 shown in FIG. 5D may include a plurality of arms 56a to 56d protruding in a circular shape from an outer circumference surface of a circular disk. As shown in an arrow of FIG. 5D, the resonator 56 may have various resonant frequencies. Although the resonator 56 includes the four arms 56a to 56d in FIG. 5D, this is merely one example.

Figure 5E:
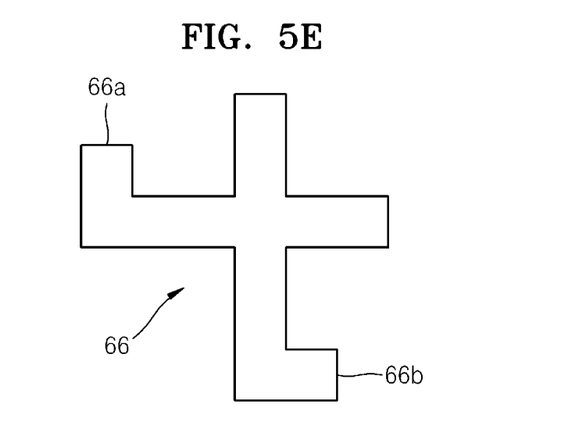

A resonator 66 shown in FIG. 5E may include two rod components perpendicular to each other in a cross shape may be used. Here, in the resonator 66 of FIG. 6E, ends 66a and 66b of the rod components may be rectangularly bent to increase a bandwidth of the resonator 66. Although only the two ends 66a and 66b are bent in the resonator 66 of FIG. 5E, the number of bent portions may be adequately selected according to a design. Also, each of the bent portions may have an adequate length as necessary.

Figure 5F:
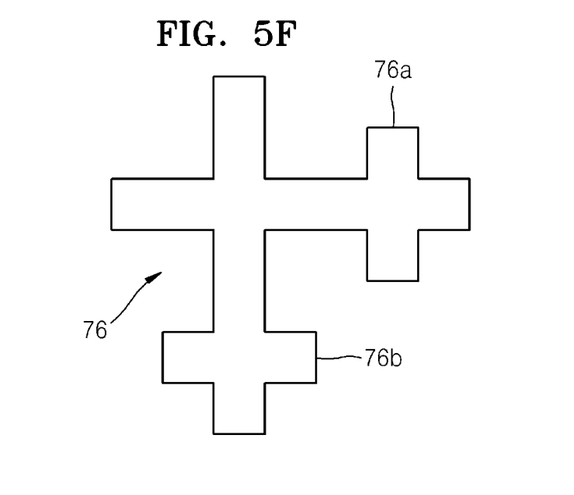

A resonator 76 shown in FIG. 5F may include two rod components perpendicular to each other in a cross shape and protrusions 76a and 76b protruding from both side surfaces of the rod components 76a and 76b may be used.

The above-described infrared detector 10 may be used for infrared thermal cameras in which a plurality of unit pixels are arranged in a two-dimensional array. Alternatively, the infrared detector 10 may be used for infrared detection sensors or thermal sensors that have only one unit pixel structure.

So far, for ease of understanding, example embodiments with respect to the infrared detector including the broadband surface plasmon resonator were described with reference to the accompanying drawings. However, these example embodiments are merely illustrative of the disclosure, and thus should not be construed as limiting to the scope of the present disclosure. It is to be understood that the embodiments not limited to the example embodiments as described above, as there may be variations and modifications made by those skilled in the art.

What is claimed is:

1. An infrared detector configured to detect electromagnetic waves within an infrared wavelength, comprising:
   a substrate;
   a first support member and a second support member, both of which vertically protrude from the substrate;
   a first thermal leg, a first end of the first thermal leg being connected to an upper portion of the first support member in a cantilever shape;
   a second thermal leg, a first end of the second thermal leg being connected to an upper portion of the second support member in a cantilever shape;
   a first thermistor member connected to a second end of the first thermal leg such that the first thermistor member is spaced apart from the substrate, the first thermistor member facing a first corner of the substrate;
   a second thermistor member connected to a second end of the second thermal leg such that the second thermistor member is spaced apart from the substrate, the second thermistor member facing a second corner of the substrate;
   a third thermistor member facing a third corner of the substrate;
   a fourth thermistor member facing a fourth corner of the substrate;
   a first connection member configured to connect the first thermistor member and the third thermistor member, the first connection member being spaced apart from the substrate;
   a second connection member configured to connect the second thermistor member and the fourth thermistor member, the second connection member being spaced apart from the substrate;
   a third connection member configured to connect the third thermistor member and the fourth thermistor member, the third connection member being spaced apart from the substrate;
   a first resonator, a second resonator, a third resonator, and a fourth resonator respectively disposed on the first thermistor member, the second thermistor member, the third thermistor member, and the fourth thermistor member, the first resonator and the second resonator being configured to generate surface plasmon resonance; and
   a first conductive lead wire and a second conductive lead wire respectively disposed on the first thermal leg and the second thermal leg, wherein
   each of the first, second, third and fourth resonators has a plurality of resonant frequencies and is configured to generate the surface plasmon resonance in a plurality of resonant modes, and
   a distance between two adjacent thermistor members of the first, second, third, and fourth thermistor members is less than 6 μm such that light having a wavelength of an entire wavelength band, which is incident on the infrared detector, is not diffracted.

2. The infrared detector of claim 1, further comprising:
   a reflective plate disposed on a surface of the substrate such that the reflective plate faces the first, second, third and fourth thermistor members and the first, second, third, and fourth resonators, the reflective plate configured to reflect an incident electromagnetic wave.

3. The infrared detector of claim 1, wherein the first, second, third and fourth resonators are identical in a size and in a shape.

4. The infrared detector of claim 1, wherein each of the first, second, third, and fourth thermistor members is formed of at least one of amorphous silicon, vanadium oxide, nickel oxide, and Si—Ge.

5. The infrared detector of claim 1, wherein each of the first, second, third, and fourth resonators comprises:
   a metal thin film formed of one of Gold (Au), Silver (Ag), Platinum (Pt), Copper (Cu), Aluminum (Al), Titanium (Ti), or an alloy thereof.

6. The infrared detector of claim 1, wherein each of the first, second, third and fourth resonators comprises:

a first side having a first arm and a second arm protruding in a direction perpendicular to the first side;

a second side adjacent to the first side, the second side having a third arm and a fourth arm protruding in a direction perpendicular to the second side;

a third side opposite to the first side, the third side having a fifth arm and a sixth arm protruding in a direction perpendicular to the second side; and a fourth side opposite to the second side, the fourth side having a seventh arm and a eighth arm protruding in a direction perpendicular to the second side, wherein the first arm and the sixth arm face each other such that a first resonant part is disposed there between in a first direction, the second arm and the fifth arm face each other such that a second resonant part is disposed there between in the first direction, the third arm and the eighth arm face each other such that a third resonant part is disposed there between in a second direction, the second direction being perpendicular to the first direction, and the fourth arm and the seventh arm face each other such that a fourth resonant part is disposed there between in the second direction.

7. The infrared detector of claim 6, wherein the first, second, third, fourth, fifth, sixth, seventh, and eighth arms have a same protrusion length.

8. The infrared detector of claim 6, wherein the first arm and the sixth arm have different protrusion lengths, the second arm and the fifth arm have different protrusion lengths, the third arm and the eighth arm have different protrusion lengths, and the fourth arm and the seventh arm have different protrusion lengths, and the first and the second arm have a same protrusion length, the third arm and the fourth arm have a same protrusion length, the fifth and the sixth arm have a same protrusion length, and the seventh arm and the eighth arm have a same protrusion length.

9. The infrared detector of claim 6, wherein the first arm and the sixth arm have a same protrusion length, the second arm and the fifth arm have a same protrusion length, the third arm and the eighth arm have a same protrusion length, and the fourth arm and the seventh arm have a same protrusion length, and the first and the second arm have different protrusion lengths, the third arm and the fourth arm have different protrusion lengths, the fifth and the sixth arm have different protrusion lengths, and the seventh arm and the eighth arm have different protrusion lengths.

10. The infrared detector of claim 6, wherein a first distance between ends of the first arm and the sixth arm, a second distance between ends of the second arm and the fifth arm, a third distance between ends of the third arm and the eighth arm, and a fourth distance between ends of the fourth arm and the seventh arm are between 2.5 µm and 3 µm.

* * * * *